«12» United States Patent
Hu

(10) Patent No.: US 8,059,503 B2
(45) Date of Patent: Nov. 15, 2011

(54) BACKUP DEVICE AND ONE-KEY DATA BACKUP METHOD FOR THE SAME

(75) Inventor: Chia-Che Hu, Taipei (TW)

(73) Assignee: EZPNP Technologies Corp., Taipei County (TW)

( * ) Notice: Subject to any disclaimer, the term of this patent is extended or adjusted under 35 U.S.C. 154(b) by 57 days.

(21) Appl. No.: 12/647,957

(22) Filed: Dec. 28, 2009

(65) Prior Publication Data

US 2011/0158066 A1    Jun. 30, 2011

(51) Int. Cl.
*G11B 7/00* (2006.01)
(52) U.S. Cl. .................. 369/47.12; 369/84; 369/53.2
(58) Field of Classification Search .................. None
See application file for complete search history.

(56) References Cited

U.S. PATENT DOCUMENTS 7,702,824 B2 *   4/2010   Rossi ........................... 710/15
7,778,989 B2 *   8/2010   Oyanagi et al. ............ 707/705

* cited by examiner

*Primary Examiner* — Muhammad N Edun
(74) *Attorney, Agent, or Firm* — Muncy, Geissler, Olds & Lowe, PLLC

(57) ABSTRACT

A backup device and a one-key data backup method for the same use a backup device having ability to retrieve a memory card and an optical disc. The backup device is connected to an external computer. A backup application is installed having backup conditions configured in the external computer. When an input unit of the backup device is triggered, the backup device sends a backup request instruction to the external computer. The external computer executes the backup application upon receiving the backup request instruction, and records data of the memory card to an optical disc, or saves the data of the optical disc in the memory card based on configured backup conditions.

12 Claims, 3 Drawing Sheets

BACKUP DEVICE AND ONE-KEY DATA BACKUP METHOD FOR THE SAME

BACKGROUND OF THE INVENTION

1. Field of the Invention

The present invention generally relates to a backup method, in particular, relates to a backup method using a one-key trigger.

2. Description of Prior Art

With the spread of computers and the advancement of technology, people nowadays heavily depend on digital technology in everyday life, which leads to a rapid increase of digitalized data. Analogue mediums used for data storage for example: photos, motion films as well as music tapes, rolls and cassettes, are converted to and replaced by digital storage medium providing people ease of use.

Along with the trend in using digital data in common, digital data storage mediums such as an optical disc, a hard drive, a memory card and a portable drive become indispensable necessities one cannot live without. Yet, each mentioned storage medium is used in specific fields. For example, a rewritable optical disc (CD-RW or DVD-RW) is used for recording data backup, a hard drive is used as main database in a computer, and a memory card is generally used in a digital camera. Nonetheless, digital mediums come with diversified choices, data transfer or data backup between above mentioned storage mediums involves complicated procedures which troubles users.

For example, data capacity of a memory card increases while the price drops significantly. Yet, a data storage configuration of a memory card supported by a digital camera was limited by the architecture of the digital camera during development. Currently, a digital camera typically supports a memory card with data storage capacity up to 4 G Bytes or 8 G Bytes the maximum. There are older models only supports a memory card with data storage capacity up to 2 G Bytes, which are totally behind the technology development of memory cards. As a result, users of old models have to keep more than one memory card as spare in case the users need more storage space. It is also an essential procedure to the users to regularly create data backup of the memory card and delete old data in the memory card. Generally, users of digital cameras categorize photos according to shooting date, locations or themes and record data backups on different optical disc. In an example of creating digital photo backup, required steps are listed in the following:

1. Insert a memory card into a card reader and connect the card reader to a computer;
2. Put an optical disc in an optical disc recorder, and connect the optical disc recorder to a computer;
3. Launch a recording application;
4. Select a source location and a target location;
5. Select data to record in the source location;
6. Performing data recording;
7. Delete data in the memory card upon the recording is completed.

As mentioned above, the backup data steps are complicated and uninteresting. The whole back up process is repetitive and lengthy. Further, not every user is familiar with detailed operation steps of a recording application. It is desirable to provide a most convenient and simplest method to rapidly create data backup between various storage mediums.

SUMMARY OF THE INVENTION

The objective of the invention is to provide a backup device having a card reader and an optical disc recorder installed in one casing and connected to an external computer via a single transfer cable, so as to allow the external computer to retrieve data in a memory card and an optical disc of the backup device via such connection.

Another objective of the invention is to provide a backup device using one-key data backup method, wherein data of the memory card is automatically recorded to an optical disc, or data of the optical disc is automatically saved to a memory card upon triggering an input unit of the backup device.

In order to achieve above mentioned goal, the invention utilizes a backup device having the ability to retrieve a memory card and an optical disc. The backup device is connected to an external computer. A backup application is installed having backup conditions configured in the external computer. When an input unit of the backup device is triggered, the backup device sends a backup request instruction to the external computer. The external computer executes the backup application upon receiving the backup request instruction, and records data of the memory card to an optical disc, or saves the data of the optical disc in the memory card based on configured backup conditions.

Compare to prior art, the invention provides an advantage of using the single casing and the transfer cable connecting the card reader and the optical disc recorder in the casing to the external computer so as to allow the external computer to retrieve data in the memory card and the optical disc. Not only usage of cables and associated hardware required are reduced because the card reader and the optical device are combined in one, also the backup application directly creates data backup upon the input unit is triggered without complicated operating steps. In addition, the time required to create data backup is shortened.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

In cooperation with attached drawings, the technical contents and detailed description of the present invention are described thereinafter according to a preferable embodiment, being not used to limit its executing scope. Any equivalent variation and modification made according to appended claims is all covered by the claims claimed by the present invention.

Figure 1:
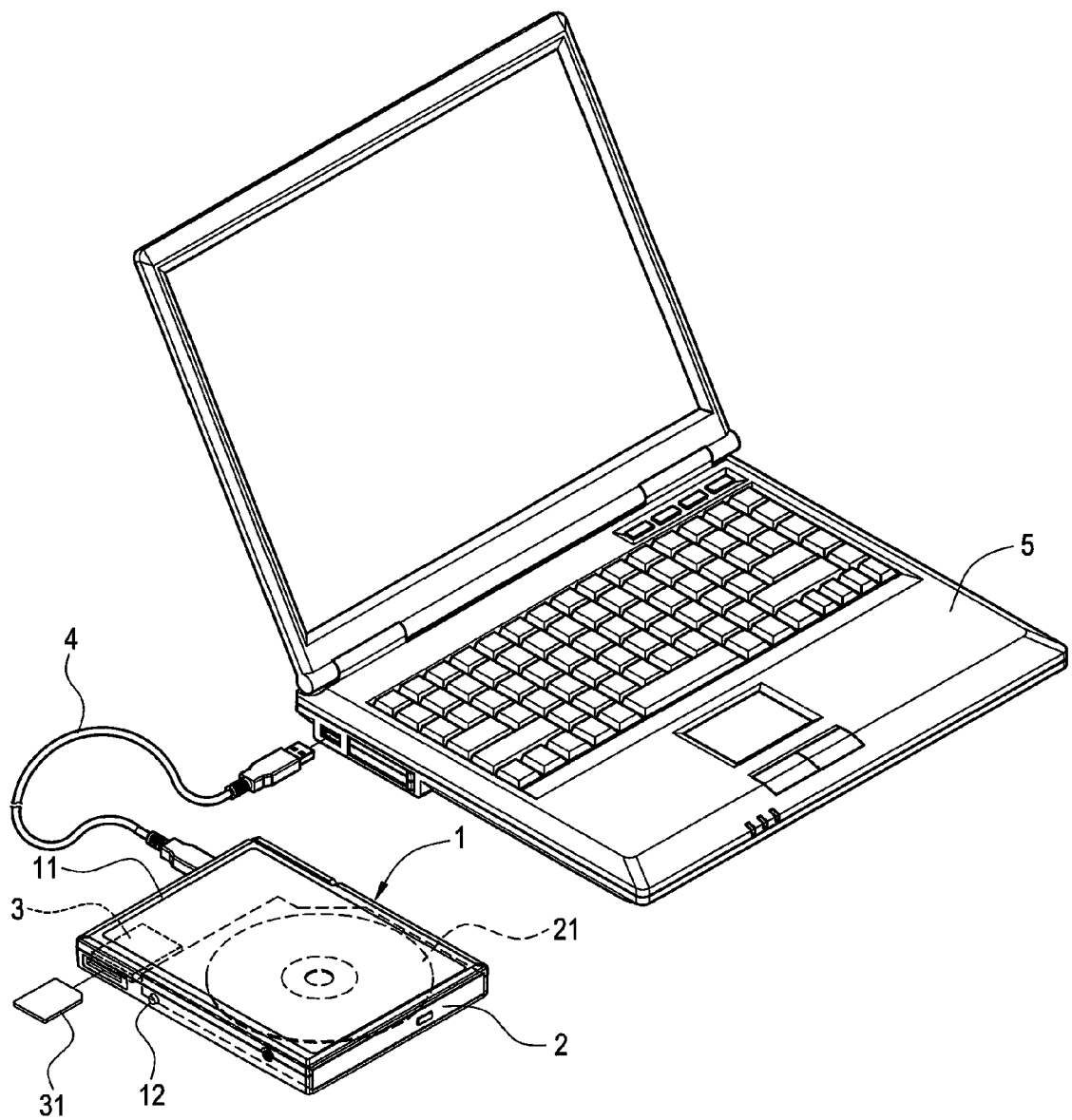
FIG. 1 is a schematic drawing illustrating structure of a preferred embodiment according to the present invention.

FIG. 1 is a schematic drawing illustrating structure of a preferred embodiment according to the present invention. According to the present invention, a backup device 1 comprises a casing 11, an input unit 12, an optical drive apparatus 2 and a card reader apparatus 3. The optical drive apparatus 2 and the card reader apparatus 3 are disposed within the same casing 11, the optical drive apparatus 2 and the card reader apparatus 3 are used for retrieving an optical disc 21 and a memory card 31. The input unit 12 is disposed at the backup device 1 extruding out of the casing 11 and used as a button to set an external trigger by a user, but is not limited to the preferred embodiment. The backup device 1 is interconnected to an external computer 5 via a single transfer cable 4. The external computer 5 retrieves data the optical disc 21 and the memory card 31 with the optical drive apparatus 2 and the card reader apparatus 3 in the backup device 1, after the backup device 1 is connected to the external computer 5.

Figure 2:
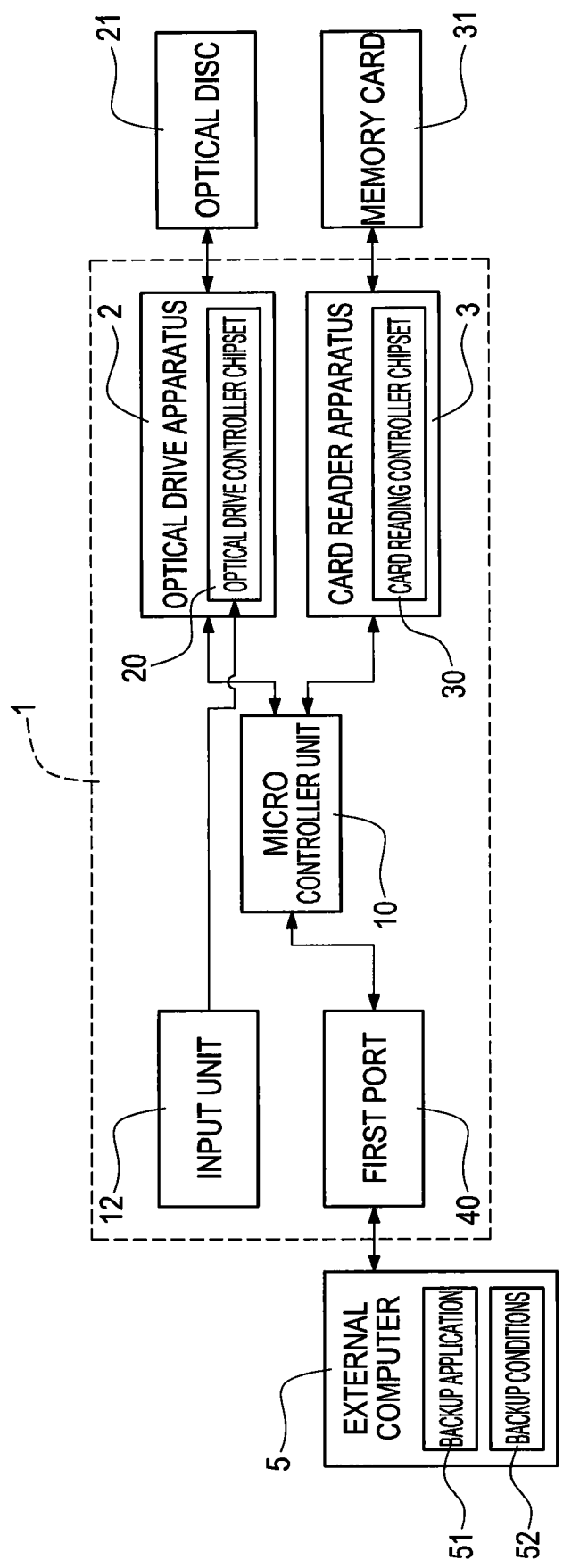
FIG. 2 is a block diagram of the preferred embodiment according to the present invention.

FIG. 2 is a block diagram of the preferred embodiment according to the present invention. As shown in the diagram, the optical drive apparatus 2 and the card reader apparatus 3 are electrically connected via a micro controller unit 10 in the backup device 1 of the present invention. The micro controller unit 10 is electrically connected to a first port 40, and the first port 40 is extruded out of the casing 11 used for receiving the transfer cable 4 connecting the back up device 1 to the external computer 5. The optical drive apparatus 2 is a optical disc recorder supporting formats of optical discs 21 such as a CD-R, CD-RW, DVD+R, DVD-R, or a Blue-Ray Disc (BD). The card reader apparatus 3 is a card reader supports formats of memory cards such as a Multimedia Card (MMC), a Secure Digital Card (SD Card), a Memory Stick (MS) and a Extreme Digital Picture Card (xDPC). The first port 40 is interface port supports protocol such as a Universal Serial Bus (USB), External Serial Advanced Technology Attachment (eSATA) or FireWire (IEEE1394). The transfer cable 4 supports protocol selected to use in the first port 40 but the combinations of above mentioned configurations are not limited by the present invention.

The optical drive apparatus 2 has an optical drive controller chipset 20, and the card reader apparatus 3 has a card reading controller chipset 30, wherein the chipsets 20, 30 are input with a unique manufacturer code (also known as vendor identifier, VID) and a product code (also known as product identifier, PID). The backup method of the present invention is used for configuring backup conditions 52, which is provided for configuring a backup source apparatus and a backup target apparatus. If a user respectively configures the optical drive apparatus 2 and the card reader apparatus 3 as the backup source apparatus and the backup target apparatus in the backup device 1, the external computer 5 identifies a PID and a VID of the chipsets 20, 30 in the apparatuses 2, 3 with the backup application 51. The backup application 51 checks the PID and the VID of the optical drive apparatus 2 and the card reader apparatus 3 to confirm that the backup device connected with is exactly the backup device 1 configured to identify according to the backup conditions.

The input unit 12 is connected to the optical drive controller chipset 20 the optical drive apparatus 2. When the input unit 12 receives an external trigger, the optical drive controller chipset generates a backup request instruction transferred to the external computer 5 via the micro controller unit 10 and the first port 40. The backup request instruction is used for initiating a backup application 51 installed in the external computer 5. Next, the external computer 5 connects to the optical drive apparatus 2 and the card reader apparatus 3 based on the configured backup conditions 52 with the backup application 51 and create backup on data saved in the optical disc 21 and the memory card 31.

Figure 3:
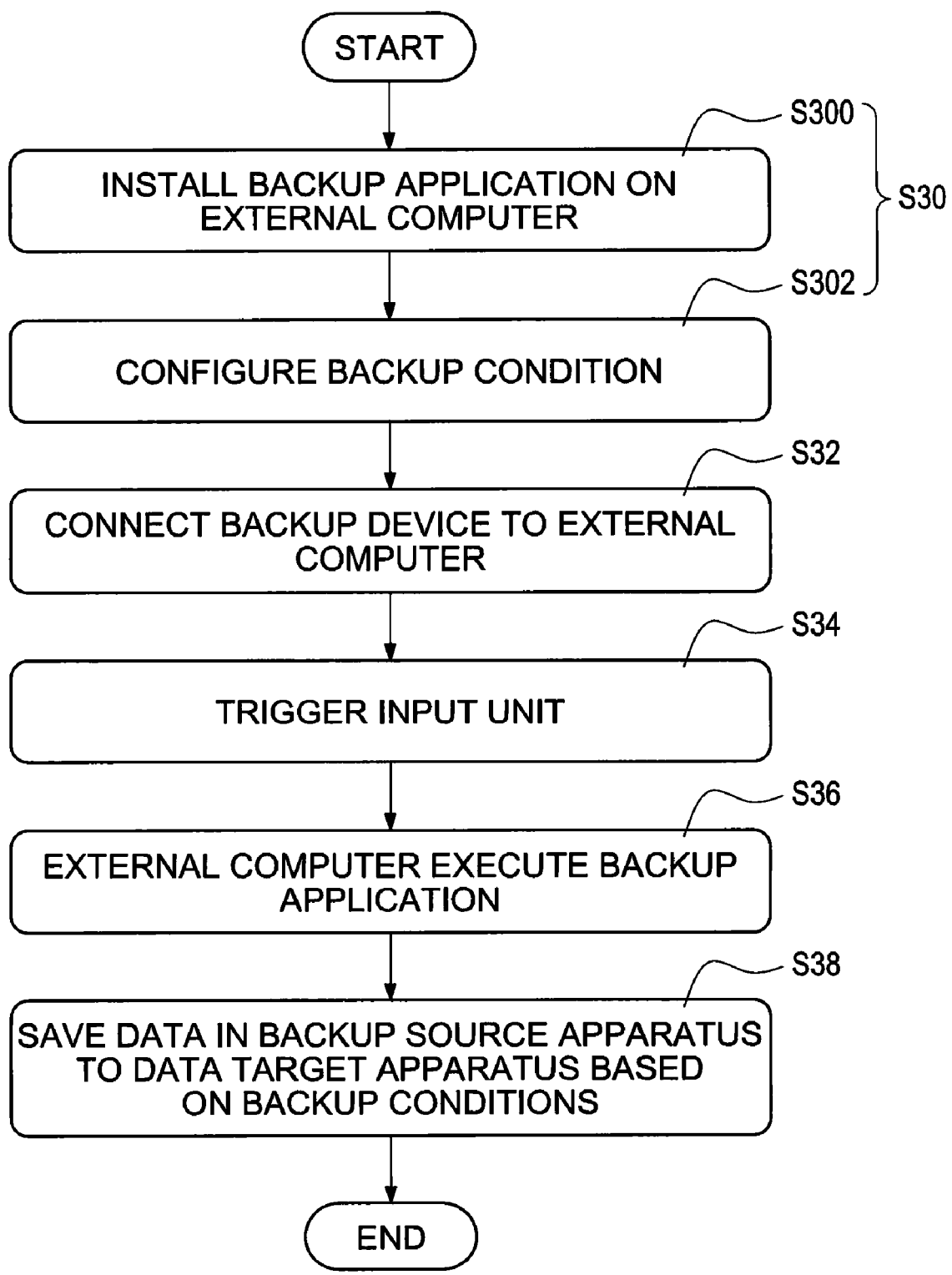
FIG. 3 is a flow chart of the preferred embodiment according to the present invention.

FIG. 3 is a flow chart of the preferred embodiment according to the present invention. Firstly, before performing steps of an one-key data backup method according to the present invention, there are related backup configurations to setup on the external computer 5 (step S30). The step S30 comprises:

step S300: install the backup application 51 in the external computer 5; and step S302: configure the backup conditions 52.

The backup application 51 is used for recording data to the optical disc 21, or saving data to the memory card 31, but is not limited to the embodiment only. The backup conditions 52 are also used for configuring backup model in addition to configuring the backup source apparatus and the backup target apparatus as mentioned above. For example, if the card reader apparatus 3 is configured as the backup source apparatus, the optical drive apparatus 2 is configured as the backup target apparatus, and the backup model is configured as complete data backup, then the backup device 1 records all data saved in the memory card 31 of the card reader apparatus 3 to the optical disc 21 of the optical drive apparatus 2 with the backup application 51 according to the operation steps in the backup method of the invention.

It should be noted that, the above mentioned backup conditions 52 is configured by the backup device 1 when the backup device 1 firstly connects to the external computer 5. The backup conditions 52 is provided so that the external computer 5 identifies a PID and a VID of chipsets 20, 30 and configures the apparatuses 2, 3 of the backup device 1 based on the backup conditions 52 with the backup application 51. Accordingly, when a second backup device (not shown) is connected to the external computer 5, the external computer 5 detects the backup device to identify a PID and a VID of the second backup device with the backup application 51. Next, the external computer 5 determines that the second backup device is not the backup device 1 configured in the backup conditions 52. Under the circumstance, it is required to re-configure the backup conditions 52 so as to allow the backup application 51 re-identifies the PID and the VID of the second backup device and perform steps of the backup method according to present invention on second backup device. The above mentioned embodiment is only a preferred embodiment of the present invention, and is not used to limit the scope of the present invention.

The installation of the backup application 51 and configurations of the backup conditions 52 are completed in the step S30. Before performing the data backup, a user is required to re-connect the backup device 1 to the external computer 5 (step S32), wherein the external computer 5 communicates to the micro controller unit 10 of the backup device 1. Additionally, the external computer 5 is allowed to identify information (PID and VID) of the optical drive apparatus 2 and the card reader apparatus 3 and further to retrieve data in the optical disc 21 and the memory card 31. For example, a user views information saved in the optical drive apparatus 2 and the card reader 3 with My Computer, Windows Explorer of WINDOWS or with the backup application 51 in the external computer 5 and retrieves the data in the optical disc 21 and the memory card 31.

Next, under the status of the backup device 1 connecting to the external computer 5, the input unit 12 of the backup device 1 is triggered (step S34), and the optical drive controller chipset of the backup device 1 generates the backup request instruction to transfer to the external computer 5 via the micro controller unit 10 and the first port 40. The external computer 5 automatically executes the installed backup application 51 upon receiving the backup request instruction (step S36). Upon the backup application 51 is launched, the backup application 51 saves data of the backup source apparatus in the backup target apparatus according to configured backup model based on the backup conditions 52 in the step S302 (step S38). For example, the backup application 51 records all data in the memory card 31 of the card reader apparatus 3 to the optical disc 21 of the optical drive apparatus 2. In another example, the backup application 51 saves specific data on the optical disc 21 in the optical drive apparatus 2 to the memory card 31 of the card reader apparatus 3 and so on. However, if the user desires to change the backup source apparatus, the backup target apparatus or the backup model configured in the backup conditions 52, the user launches the backup application 51 in the external computer 5 and re-configure related settings.

As the skilled person will appreciate, various changes and modifications can be made to the described embodiments. It is intended to include all such variations, modifications and equivalents which fall within the scope of the invention, as defined in the accompanying claims.

What is claimed is:

1. A backup device for creating data backup connected to an external computer via a single transfer cable, the backup device comprising:
    an optical drive apparatus used for retrieving data in an optical disc;
    a card reader apparatus used for retrieving data in a memory card;
    a micro controller unit electrically connected to the optical drive apparatus and the card reader apparatus; and
    an input unit electrically connected to the optical drive apparatus;
    wherein the input unit receives an external trigger to enable the backup device to send a backup request instruction to the external computer for creating a data backup of data in the optical disc or the memory card via a backup application in the external computer,
    wherein the optical drive apparatus comprises an optical drive controller chipset, the card reader apparatus comprises a card reading controller chipset, each chipset a manufacturer code and a product code of the optical drive apparatus and the card reader apparatus respectively used for identifying the optical drive apparatus and the card reader apparatus connected by the external computer.

2. The backup device of claim 1, wherein the optical drive apparatus is an optical disc recorder for recording CD-R, CD-RW, DVD+R, DVD-R or Blue-Ray Disc (BD).

3. The backup device of claim 1, wherein the card reader apparatus is a card reader apparatus for reading multimedia card (MMC), secure digital card (SD Card), memory stick (MS) and extreme digital picture card (xDPC).

4. The backup device of claim 1, wherein the backup device further comprises a first port electrically connected to the micro controller unit used for receiving the transfer cable whereby the backup device is connected to the external computer.

5. The backup device of claim 4, wherein the first port is a universal serial bus (USB), external serial advanced technology attachment (eSATA) or firewire (IEEE1394).

6. The backup device of claim 5, wherein the backup device further comprises a casing used for receiving the optical drive apparatus, the card reader apparatus, the micro controller unit, the input unit and the first port, wherein the input unit is protruded from the casing for receiving external trigger, the casing has an opening, the first port is extruded from the casing through the opening for receiving the transfer cable.

7. The backup device of claim 6, wherein the input unit is a button.

8. The backup device of claim 1, wherein the input unit is electrically connected to the optical drive controller chipset of the optical drive apparatus and the input unit is triggered to enable the optical drive controller chipset to send the backup request instruction to the external computer.

9. A one-key data backup method on a backup device using a backup application installed in an external computer and configuring backup conditions based on information of the backup device, the method comprising:
    a) connecting the backup device to an external computer;
    b) receiving an external trigger at the backup device;
    c) executing the backup application at the external computer;
    d) creating a data backup of the backup device with the backup application based on the backup conditions,
    wherein the method further comprises a step b1 following the step b: sending a backup request instruction to the external computer at the backup device to assure that the external computer executing the backup application upon receiving the backup request instruction in the step c.

10. The one-key data backup method of claim 9, wherein the backup device comprises an optical drive apparatus and a card reader apparatus, the optical drive apparatus and the card reader apparatus are respectively configured as a backup source apparatus and a backup target apparatus with the backup conditions.

11. The one-key data backup method of claim 10, wherein the backup application saves data of the backup source apparatus in the backup target apparatus according to the backup conditions in the step d.

12. The one-key data backup method of claim 10, wherein the backup application identifies the optical drive apparatus and the card reader apparatus of the backup device based on a manufacturer code and a product code of the optical drive apparatus and the card reader apparatus when configuring the backup conditions.

* * * * *